(12) United States Patent
Wang et al.

(10) Patent No.: US 9,348,076 B2
(45) Date of Patent: May 24, 2016

(54) POLARIZER WITH VARIABLE INTER-WIRE DISTANCE

(71) Applicant: Moxtek, Inc., Orem, UT (US)

(72) Inventors: Bin Wang, Lindon, UT (US); Ted Wangensteen, Pleasant Grove, UT (US); Rumyana Petrova, Pleasant Grove, UT (US); Mike Black, Orem, UT (US); Steven Marks, Orem, UT (US); Dean Probst, West Jordan, UT (US)

(73) Assignee: Moxtek, Inc., Orem, UT (US)

( * ) Notice: Subject to any disclaimer, the term of this patent is extended or adjusted under 35 U.S.C. 154(b) by 167 days.

(21) Appl. No.: 14/470,566

(22) Filed: Aug. 27, 2014

(65) Prior Publication Data

US 2015/0116825 A1  Apr. 30, 2015

Related U.S. Application Data

(60) Provisional application No. 61/924,569, filed on Jan. 7, 2014, provisional application No. 61/924,560, filed on Jan. 7, 2014, provisional application No. 61/895,225, filed on Oct. 24, 2013.

(51) Int. Cl.
*G02B 5/30* (2006.01)
*G02B 1/08* (2006.01)
(Continued)

(52) U.S. Cl.
CPC .............. *G02B 5/3058* (2013.01); *C23F 17/00* (2013.01); *G02B 1/08* (2013.01); *G02B 1/12* (2013.01)

(58) Field of Classification Search
CPC .......... G02B 5/3058; G02B 1/08; G02B 1/12; C23F 17/00

USPC ................................. 359/485.05, 487.03, 900
See application file for complete search history.

(56) References Cited

U.S. PATENT DOCUMENTS

| | | |
|---|---|---|
| 2,224,214 A | 12/1940 | Brown |
| 2,237,567 A | 4/1941 | Land |
| 2,287,598 A | 6/1942 | Brown |

(Continued)

FOREIGN PATENT DOCUMENTS

| | | |
|---|---|---|
| CN | 1438544 A | 8/2003 |
| CN | 1692291 | 11/2005 |

(Continued)

OTHER PUBLICATIONS

Auton et al.; "Grid Polarizers for Use in the Near Infrared." Infrared Physics, 1972, vol. 12, pp. 95-100.

(Continued)

*Primary Examiner* — Ricky D Shafer
(74) *Attorney, Agent, or Firm* — Thorpe, North & Western, LLP

(57) ABSTRACT

A wire grid polarizer comprising an array of parallel, elongated nano-structures disposed over a surface of a substrate. Each of the nano-structures can include a pair of parallel, elongated wires (or top ribs), each oriented laterally with respect to one another. There can be a first gap disposed between the pair of wires (or top ribs). Each of the nano-structures can be separated from an adjacent nano-structure by a second gap disposed between adjacent nanostructures, and thus between adjacent pairs of wires. A first gap width of the first gap can be different than a second gap width of the second gap. Also included are methods of making wire grid polarizers.

20 Claims, 5 Drawing Sheets

(51) Int. Cl.
  *G02B 1/12* (2006.01)
  *C23F 17/00* (2006.01)

(56) References Cited

U.S. PATENT DOCUMENTS

| | | | |
|---|---|---|---|
| 2,391,451 A | 12/1945 | Fischer |
| 2,403,731 A | 7/1946 | MacNeille |
| 2,605,352 A | 7/1952 | Fischer |
| 2,748,659 A | 6/1956 | Geffcken et al. |
| 2,813,146 A | 11/1957 | Glenn |
| 2,815,452 A | 12/1957 | Mertz |
| 2,887,566 A | 5/1959 | Marks |
| 3,046,839 A | 7/1962 | Bird et al. |
| 3,084,590 A | 4/1963 | Glenn, Jr. |
| 3,202,039 A | 8/1965 | Lang et al. |
| 3,213,753 A | 10/1965 | Rogers |
| 3,235,630 A | 2/1966 | Doherty et al. |
| 3,291,550 A | 12/1966 | Bird et al. |
| 3,291,871 A | 12/1966 | Francis |
| 3,293,331 A | 12/1966 | Doherty |
| 3,436,143 A | 4/1969 | Garrett |
| 3,479,168 A | 11/1969 | Bird et al. |
| 3,536,373 A | 10/1970 | Bird et al. |
| 3,566,099 A | 2/1971 | Makas |
| 3,627,431 A | 12/1971 | Komarniski |
| 3,631,288 A | 12/1971 | Rogers |
| 3,653,741 A | 4/1972 | Marks |
| 3,731,986 A | 5/1973 | Fergason |
| 3,857,627 A | 12/1974 | Harsch |
| 3,857,628 A | 12/1974 | Strong |
| 3,876,285 A | 4/1975 | Schwarzmüller |
| 3,877,789 A | 4/1975 | Marie |
| 3,912,369 A | 10/1975 | Kashnow |
| 3,969,545 A | 7/1976 | Slocum |
| 4,009,933 A | 3/1977 | Firester |
| 4,025,164 A | 5/1977 | Doriguzzi et al. |
| 4,025,688 A | 5/1977 | Nagy et al. |
| 4,049,944 A | 9/1977 | Garvin et al. |
| 4,068,260 A | 1/1978 | Ohneda et al. |
| 4,073,571 A | 2/1978 | Grinberg et al. |
| 4,104,598 A | 8/1978 | Abrams |
| 4,181,756 A | 1/1980 | Fergason |
| 4,220,705 A | 9/1980 | Sugibuchi et al. |
| 4,221,464 A | 9/1980 | Pedinoff et al. |
| 4,268,127 A | 5/1981 | Oshima et al. |
| 4,289,381 A | 9/1981 | Garvin et al. |
| 4,294,119 A | 10/1981 | Soldner |
| 4,308,079 A | 12/1981 | Venables et al. |
| 4,441,791 A | 4/1984 | Hornbeck |
| 4,456,515 A | 6/1984 | Krueger et al. |
| 4,466,704 A | 8/1984 | Schuler et al. |
| 4,492,432 A | 1/1985 | Kaufmann et al. |
| 4,512,638 A | 4/1985 | Sriram et al. |
| 4,514,479 A | 4/1985 | Ferrante |
| 4,515,441 A | 5/1985 | Wentz |
| 4,515,443 A | 5/1985 | Bly |
| 4,532,619 A | 7/1985 | Sugiyama et al. |
| 4,560,599 A | 12/1985 | Regen |
| 4,679,910 A | 7/1987 | Efron et al. |
| 4,688,897 A | 8/1987 | Grinberg et al. |
| 4,701,028 A | 10/1987 | Clerc et al. |
| 4,711,530 A | 12/1987 | Nakanowatari et al. |
| 4,712,881 A | 12/1987 | Shurtz, II et al. |
| 4,724,436 A | 2/1988 | Johansen et al. |
| 4,743,092 A | 5/1988 | Pistor |
| 4,743,093 A | 5/1988 | Oinen |
| 4,759,611 A | 7/1988 | Downey, Jr. |
| 4,759,612 A | 7/1988 | Nakatsuka et al. |
| 4,763,972 A | 8/1988 | Papuchon et al. |
| 4,795,233 A | 1/1989 | Chang |
| 4,799,776 A | 1/1989 | Yamazaki et al. |
| 4,818,076 A | 4/1989 | Heppke et al. |
| 4,840,757 A | 6/1989 | Blenkhorn |
| 4,865,670 A | 9/1989 | Marks |
| 4,870,649 A | 9/1989 | Bobeck et al. |
| 4,893,905 A | 1/1990 | Efron et al. |
| 4,895,769 A | 1/1990 | Land et al. |
| 4,904,060 A | 2/1990 | Grupp |
| 4,913,529 A | 4/1990 | Goldenberg et al. |
| 4,915,463 A | 4/1990 | Barbee, Jr. |
| 4,939,526 A | 7/1990 | Tsuda |
| 4,946,231 A | 8/1990 | Pistor |
| 4,966,438 A | 10/1990 | Mouchart et al. |
| 4,974,941 A | 12/1990 | Gibbons et al. |
| 4,991,937 A | 2/1991 | Urino |
| 5,029,988 A | 7/1991 | Urino |
| 5,039,185 A | 8/1991 | Uchida et al. |
| 5,061,050 A | 10/1991 | Ogura |
| 5,087,985 A | 2/1992 | Kitaura et al. |
| 5,092,774 A | 3/1992 | Milan |
| 5,113,285 A | 5/1992 | Franklin et al. |
| 5,115,305 A | 5/1992 | Baur |
| 5,122,887 A | 6/1992 | Mathewson |
| 5,122,907 A | 6/1992 | Slocum |
| 5,124,841 A | 6/1992 | Oishi |
| 5,139,340 A | 8/1992 | Okumura |
| 5,157,526 A | 10/1992 | Kondo et al. |
| 5,163,877 A | 11/1992 | Marpert et al. |
| 5,177,635 A | 1/1993 | Keilmann |
| 5,196,926 A | 3/1993 | Lee |
| 5,196,953 A | 3/1993 | Yeh et al. |
| 5,198,921 A | 3/1993 | Aoshima et al. |
| 5,204,765 A | 4/1993 | Mitsui et al. |
| 5,206,674 A | 4/1993 | Puech et al. |
| 5,216,539 A | 6/1993 | Boher et al. |
| 5,222,907 A | 6/1993 | Katabuchi et al. |
| 5,225,920 A | 7/1993 | Kasazumi et al. |
| 5,235,443 A | 8/1993 | Barnik et al. |
| 5,235,449 A | 8/1993 | Imazeki et al. |
| 5,239,322 A | 8/1993 | Takanashi et al. |
| 5,245,471 A | 9/1993 | Iwatsuka et al. |
| 5,267,029 A | 11/1993 | Kurematsu |
| 5,279,689 A | 1/1994 | Shvartsman |
| 5,295,009 A | 3/1994 | Barnik et al. |
| 5,298,199 A | 3/1994 | Hirose et al. |
| 5,305,143 A | 4/1994 | Taga et al. |
| 5,325,218 A | 6/1994 | Willett et al. |
| 5,333,072 A | 7/1994 | Willett |
| 5,349,192 A | 9/1994 | Mackay |
| 5,357,370 A | 10/1994 | Miyatake et al. |
| 5,383,053 A | 1/1995 | Hegg et al. |
| 5,387,953 A | 2/1995 | Minoura et al. |
| 5,391,091 A | 2/1995 | Nations |
| 5,401,587 A | 3/1995 | Motohiro et al. |
| 5,422,756 A | 6/1995 | Weber |
| 5,430,573 A | 7/1995 | Araujo et al. |
| 5,436,761 A | 7/1995 | Kamon |
| 5,455,589 A | 10/1995 | Huguenin et al. |
| 5,466,319 A | 11/1995 | Zager et al. |
| 5,477,359 A | 12/1995 | Okazaki |
| 5,485,499 A | 1/1996 | Pew et al. |
| 5,486,935 A | 1/1996 | Kalmanash |
| 5,486,949 A | 1/1996 | Schrenk et al. |
| 5,490,003 A | 2/1996 | Van Sprang |
| 5,499,126 A | 3/1996 | Abileah et al. |
| 5,504,603 A | 4/1996 | Winker et al. |
| 5,506,704 A | 4/1996 | Broer et al. |
| 5,508,830 A | 4/1996 | Imoto et al. |
| 5,510,215 A | 4/1996 | Prince et al. |
| 5,513,023 A | 4/1996 | Fritz et al. |
| 5,513,035 A | 4/1996 | Miyatake et al. |
| 5,517,356 A | 5/1996 | Araujo et al. |
| 5,535,047 A | 7/1996 | Hornbeck |
| 5,548,427 A | 8/1996 | May |
| 5,555,186 A | 9/1996 | Shioya |
| 5,557,343 A | 9/1996 | Yamagishi |
| 5,559,634 A | 9/1996 | Weber |
| 5,570,213 A | 10/1996 | Ruiz et al. |
| 5,570,215 A | 10/1996 | Omae et al. |
| 5,574,580 A | 11/1996 | Ansley |
| 5,576,854 A | 11/1996 | Schmidt et al. |
| 5,579,138 A | 11/1996 | Sannohe et al. |
| 5,594,561 A | 1/1997 | Blanchard |
| 5,599,551 A | 2/1997 | Kelly |

(56) References Cited

U.S. PATENT DOCUMENTS

| | | |
|---|---|---|
| 5,600,383 A | 2/1997 | Hornbeck |
| 5,602,661 A | 2/1997 | Schadt et al. |
| 5,609,939 A | 3/1997 | Petersen et al. |
| 5,612,820 A | 3/1997 | Schrenk et al. |
| 5,614,035 A | 3/1997 | Nadkarni |
| 5,619,356 A | 4/1997 | Kozo et al. |
| 5,620,755 A | 4/1997 | Smith, Jr. et al. |
| 5,626,408 A | 5/1997 | Heynderickx et al. |
| 5,638,197 A | 6/1997 | Gunning, III et al. |
| 5,652,667 A | 7/1997 | Kurogane |
| 5,658,060 A | 8/1997 | Dove |
| 5,686,979 A | 11/1997 | Weber et al. |
| 5,706,063 A | 1/1998 | Hong |
| 5,706,131 A | 1/1998 | Ichimura et al. |
| 5,719,695 A | 2/1998 | Heimbuch |
| 5,731,246 A | 3/1998 | Bakeman et al. |
| 5,748,368 A | 5/1998 | Tamada et al. |
| 5,748,369 A | 5/1998 | Yokota |
| 5,751,388 A | 5/1998 | Larson |
| 5,751,466 A | 5/1998 | Dowling et al. |
| 5,767,827 A | 6/1998 | Kobayashi et al. |
| 5,798,819 A | 8/1998 | Hattori et al. |
| 5,808,795 A | 9/1998 | Shimomura et al. |
| 5,826,959 A | 10/1998 | Atsuchi |
| 5,826,960 A | 10/1998 | Gotoh et al. |
| 5,828,489 A | 10/1998 | Johnson et al. |
| 5,833,360 A | 11/1998 | Knox et al. |
| 5,838,403 A | 11/1998 | Jannson et al. |
| 5,841,494 A | 11/1998 | Hall |
| 5,844,722 A | 12/1998 | Stephens et al. |
| 5,864,427 A | 1/1999 | Fukano et al. |
| 5,886,754 A | 3/1999 | Kuo |
| 5,890,095 A | 3/1999 | Barbour et al. |
| 5,898,521 A | 4/1999 | Okada |
| 5,899,551 A | 5/1999 | Neijzen et al. |
| 5,900,976 A | 5/1999 | Handschy et al. |
| 5,907,427 A | 5/1999 | Scalora et al. |
| 5,912,762 A | 6/1999 | Li et al. |
| 5,914,818 A | 6/1999 | Tejada et al. |
| 5,917,562 A | 6/1999 | Woodgate et al. |
| 5,918,961 A | 7/1999 | Ueda |
| 5,930,050 A | 7/1999 | Dewald |
| 5,943,171 A | 8/1999 | Budd et al. |
| 5,958,345 A | 9/1999 | Turner et al. |
| 5,965,247 A | 10/1999 | Jonza et al. |
| 5,969,861 A | 10/1999 | Ueda et al. |
| 5,973,833 A | 10/1999 | Booth et al. |
| 5,978,056 A | 11/1999 | Shintani et al. |
| 5,982,541 A | 11/1999 | Li et al. |
| 5,986,730 A | 11/1999 | Hansen et al. |
| 5,991,075 A | 11/1999 | Katsuragawa et al. |
| 5,991,077 A | 11/1999 | Carlson et al. |
| 6,005,918 A | 12/1999 | Harris et al. |
| 6,008,871 A | 12/1999 | Okumura |
| 6,008,951 A | 12/1999 | Anderson |
| 6,010,121 A | 1/2000 | Lee |
| 6,016,173 A | 1/2000 | Crandall |
| 6,018,841 A | 2/2000 | Kelsay et al. |
| 6,046,851 A | 4/2000 | Katayama |
| 6,049,428 A | 4/2000 | Khan et al. |
| 6,053,616 A | 4/2000 | Fujimori et al. |
| 6,055,103 A | 4/2000 | Woodgate et al. |
| 6,055,215 A | 4/2000 | Katsuragawa |
| 6,056,407 A | 5/2000 | Iinuma et al. |
| 6,062,694 A | 5/2000 | Oikawa et al. |
| 6,075,235 A | 6/2000 | Chun |
| 6,081,312 A | 6/2000 | Aminaka et al. |
| 6,081,376 A | 6/2000 | Hansen et al. |
| 6,082,861 A | 7/2000 | Dove et al. |
| 6,089,717 A | 7/2000 | Iwai |
| 6,096,155 A | 8/2000 | Harden et al. |
| 6,096,375 A | 8/2000 | Ouderkirk et al. |
| 6,100,928 A | 8/2000 | Hata |
| 6,108,131 A | 8/2000 | Hansen et al. |
| 6,122,103 A | 9/2000 | Perkins et al. |
| 6,122,403 A | 9/2000 | Rhoads |
| 6,124,971 A | 9/2000 | Ouderkirk et al. |
| 6,141,075 A | 10/2000 | Ohmuro et al. |
| 6,147,728 A | 11/2000 | Okumura et al. |
| 6,172,813 B1 | 1/2001 | Tadic-Galeb et al. |
| 6,172,816 B1 | 1/2001 | Tadic-Galeb et al. |
| 6,181,386 B1 | 1/2001 | Knox |
| 6,181,458 B1 | 1/2001 | Brazas, Jr. et al. |
| 6,185,041 B1 | 2/2001 | TadicGaleb et al. |
| 6,208,463 B1 | 3/2001 | Hansen et al. |
| 6,215,547 B1 | 4/2001 | Ramanujan et al. |
| 6,234,634 B1 | 5/2001 | Hansen et al. |
| 6,243,199 B1 | 6/2001 | Hansen et al. |
| 6,247,816 B1 | 6/2001 | Cipolla et al. |
| 6,249,378 B1 | 6/2001 | Shimamura et al. |
| 6,250,762 B1 | 6/2001 | Kuijper |
| 6,251,297 B1 | 6/2001 | Komura Eiju et al. |
| 6,282,025 B1 | 8/2001 | Huang et al. |
| 6,288,840 B1 | 9/2001 | Perkins et al. |
| 6,291,797 B1 | 9/2001 | Koyama et al. |
| 6,310,345 B1 | 10/2001 | Pittman et al. |
| 6,339,454 B1 | 1/2002 | Knox |
| 6,340,230 B1 | 1/2002 | Bryars et al. |
| 6,345,895 B1 | 2/2002 | Maki et al. |
| 6,348,995 B1 | 2/2002 | Hansen et al. |
| 6,375,330 B1 | 4/2002 | Mihalakis |
| 6,390,626 B2 | 5/2002 | Knox |
| 6,398,364 B1 | 6/2002 | Bryars |
| 6,406,151 B1 | 6/2002 | Fujimori |
| 6,409,525 B1 | 6/2002 | Hoelscher et al. |
| 6,411,749 B2 | 6/2002 | Teng et al. |
| 6,424,436 B1 | 7/2002 | Yamanaka |
| 6,426,837 B1 | 7/2002 | Clark et al. |
| 6,447,120 B2 | 9/2002 | Hansen et al. |
| 6,452,724 B1 | 9/2002 | Hansen et al. |
| 6,460,998 B1 | 10/2002 | Watanabe |
| 6,473,236 B2 | 10/2002 | Tadic-Galeb et al. |
| 6,486,997 B1 | 11/2002 | Bruzzone et al. |
| 6,490,017 B1 | 12/2002 | Huang et al. |
| 6,496,239 B2 | 12/2002 | Seiberle |
| 6,496,287 B1 | 12/2002 | Seiberle et al. |
| 6,511,183 B2 | 1/2003 | Shimizu et al. |
| 6,514,674 B1 | 2/2003 | Iwasaki |
| 6,520,645 B2 | 2/2003 | Yamamoto et al. |
| 6,532,111 B2 | 3/2003 | Kurtz et al. |
| 6,547,396 B1 | 4/2003 | Svardal et al. |
| 6,580,471 B2 | 6/2003 | Knox |
| 6,583,930 B1 | 6/2003 | Schrenk et al. |
| 6,585,378 B2 | 7/2003 | Kurtz et al. |
| 6,624,936 B2 | 9/2003 | Kotchick et al. |
| 6,643,077 B2 | 11/2003 | Magarill et al. |
| 6,654,168 B1 | 11/2003 | Borrelli |
| 6,661,475 B1 | 12/2003 | Stahl et al. |
| 6,661,484 B1 | 12/2003 | Iwai et al. |
| 6,665,119 B1 | 12/2003 | Kurtz et al. |
| 6,666,556 B2 | 12/2003 | Hansen et al. |
| 6,669,343 B2 | 12/2003 | Shahzad et al. |
| 6,698,891 B2 | 3/2004 | Kato |
| 6,704,469 B1 | 3/2004 | Xie et al. |
| 6,710,921 B2 | 3/2004 | Hansen et al. |
| 6,713,396 B2* | 3/2004 | Anthony ............ B82Y 10/00 438/694 |
| 6,714,350 B2 | 3/2004 | Silverstein et al. |
| 6,721,096 B2 | 4/2004 | Bruzzone et al. |
| 6,739,723 B1 | 5/2004 | Haven et al. |
| 6,746,122 B2 | 6/2004 | Knox |
| 6,764,181 B2 | 7/2004 | Magarill et al. |
| 6,769,779 B1 | 8/2004 | Ehrne et al. |
| 6,781,640 B1 | 8/2004 | Huang |
| 6,785,050 B2 | 8/2004 | Lines et al. |
| 6,788,461 B2 | 9/2004 | Kurtz et al. |
| 6,805,445 B2 | 10/2004 | Silverstein et al. |
| 6,809,864 B2 | 10/2004 | Martynov et al. |
| 6,809,873 B2 | 10/2004 | Cobb |
| 6,811,274 B2 | 11/2004 | Olczak |
| 6,813,077 B2 | 11/2004 | Borrelli et al. |
| 6,816,290 B2 | 11/2004 | Mukawa |
| 6,821,135 B1 | 11/2004 | Martin |
| 6,823,093 B2 | 11/2004 | Chang et al. |

(56) References Cited

U.S. PATENT DOCUMENTS

| | | |
|---|---|---|
| 6,829,090 B2 | 12/2004 | Katsumata et al. |
| 6,844,971 B2 | 1/2005 | Silverstein et al. |
| 6,846,089 B2 | 1/2005 | Stevenson et al. |
| 6,859,303 B2 | 2/2005 | Wang et al. |
| 6,876,784 B2 | 4/2005 | Nikolov et al. |
| 6,896,371 B2 | 5/2005 | Shimizu et al. |
| 6,897,926 B2 | 5/2005 | Mi et al. |
| 6,899,440 B2 | 5/2005 | Bierhuizen |
| 6,900,866 B2 | 5/2005 | Kurtz et al. |
| 6,909,473 B2 | 6/2005 | Mi et al. |
| 6,920,272 B2 | 7/2005 | Wang |
| 6,922,287 B2 | 7/2005 | Wiki et al. |
| 6,926,410 B2 | 8/2005 | Weber et al. |
| 6,927,915 B2 | 8/2005 | Nakai |
| 6,934,082 B2 | 8/2005 | Allen et al. |
| 6,943,941 B2 | 9/2005 | Flagello et al. |
| 6,947,215 B2 | 9/2005 | Hoshi |
| 6,954,245 B2 | 10/2005 | Mi et al. |
| 6,972,906 B2 | 12/2005 | Hasman et al. |
| 6,976,759 B2 | 12/2005 | Magarill et al. |
| 6,981,771 B1 | 1/2006 | Arai et al. |
| 7,009,768 B2 | 3/2006 | Sakamoto |
| 7,013,064 B2 | 3/2006 | Wang |
| 7,023,512 B2 | 4/2006 | Kurtz et al. |
| 7,023,602 B2 | 4/2006 | Aastuen et al. |
| 7,025,464 B2 | 4/2006 | Beeson et al. |
| 7,026,046 B2 | 4/2006 | Edlinger et al. |
| 7,046,422 B2 | 5/2006 | Kimura et al. |
| 7,046,441 B2 | 5/2006 | Huang et al. |
| 7,046,442 B2 | 5/2006 | Suganuma |
| 7,050,233 B2 | 5/2006 | Nikolov et al. |
| 7,050,234 B2 | 5/2006 | Gage et al. |
| 7,075,602 B2 | 7/2006 | Sugiura et al. |
| 7,075,722 B2 | 7/2006 | Nakai |
| 7,085,050 B2 | 8/2006 | Florence |
| 7,099,068 B2 | 8/2006 | Wang et al. |
| 7,113,335 B2 | 9/2006 | Sales |
| 7,116,478 B2 | 10/2006 | Momoki et al. |
| 7,129,183 B2 | 10/2006 | Mori et al. |
| 7,131,737 B2 | 11/2006 | Silverstein et al. |
| 7,142,363 B2 | 11/2006 | Sato et al. |
| 7,142,375 B2 | 11/2006 | Nikolov et al. |
| 7,155,073 B2 | 12/2006 | Momoki et al. |
| 7,158,302 B2 | 1/2007 | Chiu et al. |
| 7,159,987 B2 | 1/2007 | Sakata |
| 7,177,259 B2 | 2/2007 | Nishi et al. |
| 7,184,115 B2 | 2/2007 | Mi et al. |
| 7,185,984 B2 | 3/2007 | Akiyama |
| 7,203,001 B2 | 4/2007 | Deng et al. |
| 7,213,920 B2 | 5/2007 | Matsui et al. |
| 7,220,371 B2 | 5/2007 | Suganuma |
| 7,221,420 B2 | 5/2007 | Silverstein et al. |
| 7,221,501 B2 | 5/2007 | Flagello et al. |
| 7,227,684 B2 | 6/2007 | Wang et al. |
| 7,230,766 B2 | 6/2007 | Rogers |
| 7,234,816 B2 | 6/2007 | Bruzzone et al. |
| 7,236,655 B2 | 6/2007 | Momoki et al. |
| 7,255,444 B2 | 8/2007 | Nakashima et al. |
| 7,256,938 B2 | 8/2007 | Barton et al. |
| 7,268,946 B2 | 9/2007 | Wang |
| 7,297,386 B2 | 11/2007 | Suzuki et al. |
| 7,298,475 B2 | 11/2007 | Gandhi et al. |
| 7,306,338 B2 | 12/2007 | Hansen et al. |
| 7,375,887 B2 | 5/2008 | Hansen |
| 7,414,784 B2 | 8/2008 | Mi et al. |
| 7,466,484 B2 | 12/2008 | Mi et al. |
| 7,545,564 B2 | 6/2009 | Wang |
| 7,561,332 B2 | 7/2009 | Little et al. |
| 7,570,424 B2 | 8/2009 | Perkins et al. |
| 7,619,816 B2 | 11/2009 | Deng et al. |
| 7,630,133 B2 | 12/2009 | Perkins |
| 7,670,758 B2 | 3/2010 | Wang et al. |
| 7,692,860 B2 | 4/2010 | Sato et al. |
| 7,722,194 B2 | 5/2010 | Amako et al. |
| 7,755,718 B2 | 7/2010 | Amako et al. |
| 7,789,515 B2 | 9/2010 | Hansen |
| 7,800,823 B2 | 9/2010 | Perkins |
| 7,813,039 B2 | 10/2010 | Perkins et al. |
| 7,944,544 B2 | 5/2011 | Amako et al. |
| 7,961,393 B2 | 6/2011 | Perkins et al. |
| 8,009,355 B2 | 8/2011 | Nakai |
| 8,027,087 B2 | 9/2011 | Perkins et al. |
| 8,049,841 B2 | 11/2011 | Sugita et al. |
| 8,138,534 B2 | 3/2012 | Adkisson et al. |
| 8,248,697 B2 | 8/2012 | Kenmochi |
| 8,426,121 B2 | 4/2013 | Brueck et al. |
| 8,493,658 B2 | 7/2013 | Nishida et al. |
| 8,506,827 B2 | 8/2013 | Wu et al. |
| 8,611,007 B2 | 12/2013 | Davis |
| 8,619,215 B2 | 12/2013 | Kumai |
| 8,696,131 B2 | 4/2014 | Sawaki |
| 8,709,703 B2 | 4/2014 | Deng et al. |
| 8,755,113 B2 | 6/2014 | Gardner et al. |
| 8,804,241 B2 | 8/2014 | Wu et al. |
| 8,808,972 B2 | 8/2014 | Wang et al. |
| 8,913,321 B2 | 12/2014 | Davis |
| 9,097,857 B2* | 8/2015 | Hanashima ............ B82Y 20/00 |
| 2001/0006421 A1 | 7/2001 | Parriaux |
| 2001/0053023 A1 | 12/2001 | Kameno et al. |
| 2002/0003661 A1 | 1/2002 | Nakai |
| 2002/0015135 A1 | 2/2002 | Hansen et al. |
| 2002/0040892 A1 | 4/2002 | Koyama et al. |
| 2002/0122235 A1 | 9/2002 | Kurtz et al. |
| 2002/0167727 A1 | 11/2002 | Hansen et al. |
| 2002/0176166 A1 | 11/2002 | Schuster |
| 2002/0181824 A1 | 12/2002 | Huang et al. |
| 2002/0191286 A1 | 12/2002 | Gale et al. |
| 2003/0058408 A1 | 3/2003 | Magarill et al. |
| 2003/0072079 A1 | 4/2003 | Silverstein et al. |
| 2003/0081178 A1 | 5/2003 | Shimizu et al. |
| 2003/0081179 A1 | 5/2003 | Pentico et al. |
| 2003/0112190 A1 | 6/2003 | Ballarda et al. |
| 2003/0117708 A1 | 6/2003 | Kane |
| 2003/0142400 A1 | 7/2003 | Hansen et al. |
| 2003/0156325 A1 | 8/2003 | Hoshi |
| 2003/0161029 A1 | 8/2003 | Kurtz et al. |
| 2003/0193652 A1 | 10/2003 | Pentico et al. |
| 2003/0202157 A1 | 10/2003 | Pentico et al. |
| 2003/0218722 A1 | 11/2003 | Tsao et al. |
| 2003/0223118 A1 | 12/2003 | Sakamoto |
| 2003/0223670 A1 | 12/2003 | Nikolov et al. |
| 2003/0224116 A1 | 12/2003 | Chen et al. |
| 2003/0227678 A1 | 12/2003 | Lines et al. |
| 2004/0008416 A1 | 1/2004 | Okuno |
| 2004/0042101 A1 | 3/2004 | Wang |
| 2004/0047039 A1 | 3/2004 | Wang et al. |
| 2004/0047388 A1 | 3/2004 | Wang et al. |
| 2004/0051928 A1 | 3/2004 | Mi |
| 2004/0070829 A1 | 4/2004 | Kurtz et al. |
| 2004/0071425 A1 | 4/2004 | Wang |
| 2004/0095637 A1 | 5/2004 | Nikolov et al. |
| 2004/0120041 A1 | 6/2004 | Silverstein et al. |
| 2004/0125449 A1 | 7/2004 | Sales |
| 2004/0141108 A1 | 7/2004 | Tanaka et al. |
| 2004/0165126 A1 | 8/2004 | Ooi et al. |
| 2004/0169924 A1 | 9/2004 | Flagello et al. |
| 2004/0174596 A1 | 9/2004 | Umeki |
| 2004/0201889 A1 | 10/2004 | Wang et al. |
| 2004/0201890 A1 | 10/2004 | Crosby |
| 2004/0218270 A1 | 11/2004 | Wang |
| 2004/0227923 A1 | 11/2004 | Flagello et al. |
| 2004/0227994 A1 | 11/2004 | Ma et al. |
| 2004/0233362 A1 | 11/2004 | Kashima |
| 2004/0240777 A1 | 12/2004 | Woodgate et al. |
| 2004/0258355 A1 | 12/2004 | Wang et al. |
| 2005/0008839 A1 | 1/2005 | Cramer et al. |
| 2005/0018308 A1 | 1/2005 | Cassarly et al. |
| 2005/0045799 A1 | 3/2005 | Deng et al. |
| 2005/0046941 A1 | 3/2005 | Satoh et al. |
| 2005/0078374 A1 | 4/2005 | Tairo et al. |
| 2005/0084613 A1 | 4/2005 | Wang et al. |
| 2005/0088739 A1 | 4/2005 | Chiu et al. |
| 2005/0122587 A1 | 6/2005 | Ouderkirk et al. |
| 2005/0128567 A1 | 6/2005 | Wang et al. |

(56) References Cited

U.S. PATENT DOCUMENTS

| | | |
|---|---|---|
| 2005/0128587 A1 | 6/2005 | Suganuma |
| 2005/0152033 A1 | 7/2005 | Kang et al. |
| 2005/0179995 A1 | 8/2005 | Nikolov et al. |
| 2005/0180014 A1 | 8/2005 | Nikolov et al. |
| 2005/0181128 A1 | 8/2005 | Nikolov et al. |
| 2005/0190445 A1 | 9/2005 | Fukuzaki |
| 2005/0195485 A1 | 9/2005 | Hirai et al. |
| 2005/0201656 A1 | 9/2005 | Nikolov et al. |
| 2005/0206847 A1 | 9/2005 | Hansen et al. |
| 2005/0213043 A1 | 9/2005 | Nakashima et al. |
| 2005/0259324 A1 | 11/2005 | Flagello et al. |
| 2005/0271091 A1 | 12/2005 | Wang |
| 2005/0275944 A1 | 12/2005 | Wang et al. |
| 2005/0277063 A1 | 12/2005 | Wang et al. |
| 2006/0001969 A1 | 1/2006 | Wang et al. |
| 2006/0056024 A1 | 3/2006 | Ahn et al. |
| 2006/0061862 A1 | 3/2006 | Mi et al. |
| 2006/0072074 A1 | 4/2006 | Matsui et al. |
| 2006/0072194 A1 | 4/2006 | Lee |
| 2006/0087602 A1 | 4/2006 | Kunisada et al. |
| 2006/0092513 A1 | 5/2006 | Momoki |
| 2006/0103810 A1 | 5/2006 | Ma et al. |
| 2006/0113279 A1 | 6/2006 | Little |
| 2006/0118514 A1 | 6/2006 | Little et al. |
| 2006/0119937 A1 | 6/2006 | Perkins |
| 2006/0127829 A1 | 6/2006 | Deng et al. |
| 2006/0127830 A1 | 6/2006 | Deng et al. |
| 2006/0187416 A1 | 8/2006 | Ouchi et al. |
| 2006/0192960 A1 | 8/2006 | Rencs et al. |
| 2006/0215263 A1 | 9/2006 | Mi et al. |
| 2006/0238715 A1 | 10/2006 | Hirata et al. |
| 2006/0268207 A1 | 11/2006 | Tan et al. |
| 2007/0146644 A1 | 6/2007 | Ma et al. |
| 2007/0183035 A1 | 8/2007 | Asakawa et al. |
| 2007/0195676 A1 | 8/2007 | Hendriks et al. |
| 2007/0217008 A1 | 9/2007 | Wang et al. |
| 2007/0223349 A1 | 9/2007 | Shimada et al. |
| 2007/0242187 A1 | 10/2007 | Yamaki et al. |
| 2007/0242228 A1 | 10/2007 | Chen et al. |
| 2007/0242352 A1 | 10/2007 | MacMaster |
| 2007/0297052 A1 | 12/2007 | Wang et al. |
| 2008/0018997 A1* | 1/2008 | Kawazu ............... G02B 5/3058 359/487.03 |
| 2008/0037101 A1 | 2/2008 | Jagannathan et al. |
| 2008/0038467 A1 | 2/2008 | Jagannathan et al. |
| 2008/0055549 A1 | 3/2008 | Perkins |
| 2008/0055719 A1 | 3/2008 | Perkins |
| 2008/0055720 A1 | 3/2008 | Perkins |
| 2008/0055721 A1 | 3/2008 | Perkins |
| 2008/0055722 A1 | 3/2008 | Perkins |
| 2008/0055723 A1 | 3/2008 | Gardner |
| 2008/0094547 A1 | 4/2008 | Sugita et al. |
| 2008/0137188 A1 | 6/2008 | Sato et al. |
| 2008/0192346 A1 | 8/2008 | Kim et al. |
| 2008/0316599 A1 | 12/2008 | Wang et al. |
| 2009/0009865 A1 | 1/2009 | Nishida et al. |
| 2009/0040607 A1 | 2/2009 | Amako et al. |
| 2009/0041971 A1 | 2/2009 | Wang et al. |
| 2009/0052030 A1* | 2/2009 | Kaida ..................... B82Y 10/00 359/485.05 |
| 2009/0053655 A1 | 2/2009 | Deng et al. |
| 2009/0109377 A1 | 4/2009 | Sawaki et al. |
| 2009/0231702 A1 | 9/2009 | Wu et al. |
| 2010/0072170 A1* | 3/2010 | Wu ........................ G02B 5/3058 216/13 |
| 2010/0091236 A1 | 4/2010 | Matera et al. |
| 2010/0103517 A1 | 4/2010 | Davis et al. |
| 2010/0188747 A1 | 7/2010 | Ammako et al. |
| 2010/0225832 A1 | 9/2010 | Kumai |
| 2010/0238555 A1 | 9/2010 | Amako et al. |
| 2010/0239828 A1 | 9/2010 | Cornaby |
| 2010/0328767 A1 | 12/2010 | Kato |
| 2010/0328768 A1 | 12/2010 | Lines |
| 2010/0328769 A1 | 12/2010 | Perkins |
| 2011/0037928 A1 | 2/2011 | Little |
| 2011/0080640 A1 | 4/2011 | Kaida et al. |
| 2011/0096396 A1 | 4/2011 | Kaida et al. |
| 2011/0115991 A1 | 5/2011 | Sawaki |
| 2011/0235181 A1 | 9/2011 | Hayashibe et al. |
| 2012/0008205 A1 | 1/2012 | Perkins et al. |
| 2012/0075699 A1 | 3/2012 | Davis et al. |
| 2012/0086887 A1 | 4/2012 | Lee et al. |
| 2012/0105745 A1* | 5/2012 | Kumai ................. G02B 5/3058 349/5 |
| 2012/0206805 A1 | 8/2012 | Meng et al. |
| 2012/0250154 A1 | 10/2012 | Davis |
| 2013/0043956 A1 | 2/2013 | Salit et al. |
| 2013/0077164 A1 | 3/2013 | Davis |
| 2013/0128358 A1 | 5/2013 | Hanashima |
| 2013/0153534 A1 | 6/2013 | Resnick et al. |
| 2013/0155516 A1 | 6/2013 | Lines et al. |
| 2013/0201557 A1 | 8/2013 | Davis |
| 2013/0250411 A1 | 9/2013 | Bangerter et al. |
| 2013/0258471 A1 | 10/2013 | Davis |
| 2014/0300964 A1 | 10/2014 | Davis et al. |
| 2015/0077851 A1 | 3/2015 | Wang et al. |
| 2015/0116824 A1 | 4/2015 | Wang et al. |
| 2015/0131150 A1 | 5/2015 | Probst et al. |

FOREIGN PATENT DOCUMENTS

| | | |
|---|---|---|
| CN | 101688939 A | 3/2010 |
| DE | 3707984 A1 | 9/1988 |
| DE | 10327963 | 1/2005 |
| DE | 10341596 | 4/2005 |
| DE | 102004041222 | 3/2006 |
| EP | 300563 | 1/1989 |
| EP | 1347315 A1 | 9/2003 |
| EP | 2270553 | 1/2011 |
| JP | 56156815 | 12/1981 |
| JP | 58-042003 | 3/1983 |
| JP | 61122626 | 6/1986 |
| JP | 1028675 | 1/1989 |
| JP | 2308106 | 12/1990 |
| JP | 3005706 | 1/1991 |
| JP | H 03084502 | 4/1991 |
| JP | 3126910 | 5/1991 |
| JP | 04 366916 | 6/1991 |
| JP | 4331913 | 11/1992 |
| JP | 5134115 | 5/1993 |
| JP | 5288910 | 11/1993 |
| JP | 5341234 | 12/1993 |
| JP | 6138413 | 5/1994 |
| JP | H06-138413 | 5/1994 |
| JP | 06-174907 | 6/1994 |
| JP | 6202042 | 7/1994 |
| JP | 7005316 | 1/1995 |
| JP | 7072428 | 3/1995 |
| JP | 7-146469 | 6/1995 |
| JP | 07202266 | 8/1995 |
| JP | 7294850 | 11/1995 |
| JP | 7294851 | 11/1995 |
| JP | 7318861 | 12/1995 |
| JP | 9015534 | 1/1997 |
| JP | 9090122 | 4/1997 |
| JP | 9090129 | 4/1997 |
| JP | 9178943 | 7/1997 |
| JP | 9212896 | 8/1997 |
| JP | 9288211 | 11/1997 |
| JP | 10-003078 | 1/1998 |
| JP | 10073722 A | 3/1998 |
| JP | 10-153706 | 6/1998 |
| JP | 10-260403 | 9/1998 |
| JP | 10-268301 | 10/1998 |
| JP | 11-014814 | 1/1999 |
| JP | 11-164819 | 3/1999 |
| JP | 11064794 | 3/1999 |
| JP | 11142650 | 5/1999 |
| JP | 11-174396 | 7/1999 |
| JP | 11237507 | 8/1999 |
| JP | 11-258603 | 9/1999 |
| JP | 11-306581 | 11/1999 |
| JP | 2000/147487 | 5/2000 |
| JP | 2000/284117 | 10/2000 |

(56) References Cited

FOREIGN PATENT DOCUMENTS

| | | |
|---|---|---|
| JP | 2001/074935 | 3/2001 |
| JP | 2002/116302 | 4/2002 |
| JP | 2003/207646 | 7/2003 |
| JP | 3486334 B2 | 1/2004 |
| JP | 2004/157159 | 6/2004 |
| JP | 2004/309903 | 11/2004 |
| JP | 2005/151154 | 6/2005 |
| JP | 2005/195824 | 7/2005 |
| JP | 2005/202104 A | 7/2005 |
| JP | 2005/534981 | 11/2005 |
| JP | 2006/047813 | 2/2006 |
| JP | 2006/133402 | 5/2006 |
| JP | 2006/201540 | 8/2006 |
| JP | 2006/330178 | 12/2006 |
| JP | 2007/058100 | 3/2007 |
| JP | 2007/101859 | 4/2007 |
| JP | 2011/248284 A | 12/2011 |
| KR | 2003-0079268 | 10/2003 |
| KR | 10-2003-0090021 | 11/2003 |
| KR | 10-2004-0046137 | 6/2004 |
| KR | 10-2005-0017871 | 2/2005 |
| KR | 10-0707083 | 4/2007 |
| KR | 10-2013-0024041 | 3/2013 |
| SU | 1283685 | 1/1987 |
| SU | 1781659 | 12/1992 |
| TW | 200528927 A | 1/2010 |
| WO | WO 96/15474 | 5/1996 |
| WO | WO 99/59005 | 11/1999 |
| WO | WO 00/70386 | 11/2000 |
| WO | WO 01/51964 | 7/2001 |
| WO | WO 02/21205 | 3/2002 |
| WO | WO 02/077588 | 10/2002 |
| WO | 03/502708 | 1/2003 |
| WO | WO 03/069381 | 8/2003 |
| WO | WO 03/107046 | 12/2003 |
| WO | WO 2004/013684 | 2/2004 |
| WO | WO 2005/123277 | 12/2005 |
| WO | WO 2006/014408 | 2/2006 |
| WO | WO 2006/036546 | 4/2006 |
| WO | WO 2011/056496 | 5/2011 |

OTHER PUBLICATIONS

Auton; "Infrared Transmission Polarizers by Photolithography." Applied Optics; Jun. 1967; vol. 6, No. 6, pp. 1023-1027.
Baur; "A new type of beam splitting polarizer cube." Meadowlark Optics, 2005, pp. 1-9.
Bird et al.; "The Wire Grid as a Near-Infrared Polarizer." J. Op. Soc. Am. vol. 50 No. 9 (1960).
Brummelaar et al.; "Beam combining optical components," Chara Technical Report, Jan. 5, 1998, pp. TR61-1 to TR 61-17, No. 61.
Bruzzone et al.; "High-performance LCoS optical engine using cartesian polarizer technology;" SID 03 Digest, 2003, pp. 1-4.
Chen et al.; Novel polymer patterns formed by lithographically induced self-assembly (LISA)., American Chemical Society, Jan. 2005, pp. 818-821, vol. 21, No. 3.
Chen et al.; "Optimum film compensation modes for TN and VA LCDs." SID 98 Digest, pp. 315-318, 1998.
Dainty et al.; "Measurements of light scattering by characterized random rough surface." Waves in Random Media 3 (1991).
Deguzman et al.; "Stacked subwavelength gratings as circular polarization filters." Applied Optics, Nov. 1, 2001, pp. 5731-5737, vol. 40, No. 31.
Deng et al.; "Multiscale structures for polarization control by using imprint and UV lithography." Proc. of SPIE, 2005, pp. 1-12. vol. 6003.
Deng et al.; "Wideband antireflective polarizers based on integrated diffractive multilayer microstructures." Optics Letters, Feb. 1, 2006, pp. 344-346, vol. 31., No. 3.
DeSanto et al.; "Rough surface scattering." Waves in Random Media 1 (1991).
Enger et al.; "Optical elements with ultrahigh spatial-frequency surface corrugations." Applied Optics 15 Oct. 1983, vol. 22, No. 20 pp. 3220-3228.
Flanders; "Application of .100 Å linewidth structures fabricated by shadowing techniques." J. Vac. Sci. Technol., 19(4), Nov./Dec. 1981.
Flanders; "Submicron periodicity gratings as artificial anisotropic dielectrics." Appl. Phys. Lett. 42 (6), Mar. 15, 1983, pp. 492-494.
Fritsch et al.; "A liquid-crystal phase modulator for large-screen projection." IEEE, Sep. 1989, pp. 1882-1887, vol. 36, No. 9.
Glytsis et al.; "High-spatial-frequency binary and multilevel stairstep gratings: polarization-selective mirrors and broadband antireflection surfaces." Applied Optics Aug. 1, 1992 vol. 31, No. 22 pp. 4459-4470.
Haggans et al.; "Lamellar gratings as polarization components for specularly reflected beams." Journal of Modern Optics, 1993, vol. 40, No. 4, pp. 675-686.
Haisma et al.; "Mold-assisted nanolithography: a process for reliable pattern replication." Journal Vac. Sci. Technology B, Nov./Dec. 1996, pp. 4124-4128, vol. 14, No. 6.
Handbook of Optics, 1978, pp. 10-68-10-77.
Hass et al.; "Sheet Infrared Transmission Polarizers." Applied Optics Aug. 1965, vol. 4, No. 8 pp. 1027-1031.
Ho et al.; "The mechanical-optical properties of wire-grid type polarizer in projection display system." SID 02 Digest, pp. 648-651, 2002.
Knop; "Reflection Grating Polarizer for the Infrared." Optics Communications vol. 26, No. 3, Sep. 1978.
Kostal et al.; "Adding parts for a greater whole." SPIE's oeMagazine, May 2003, pp. 24-26.
Kostal et al.; "MEMS Meets Nano-optics The marriage of MEMES and nano-optics promises a new and viable platform for tunable optical filters." www.fiberoptictechnology.net, Fiber Optic Technology, Nov. 2005, pp. 8-13.
Kostal; "Nano-optic devices enable integrated fabrication." www.laserfocuswold.com, Jun. 2004 pp. 155, 157-159.
Kostal; "Nano-optics: robust, optical devices for demanding applications." Military & Aerospace Electronics, Jul. 2005, 6 pages.
Kostal; "Using advanced lithography to pattern nano-optic devices;" NanoTechnology; www.solid-state.com, Sep. 2005, p. 26 and 29.
Kuta et al.; "Coupled-wave analysis of lamellar metal transmission gratings for the visible and the infrared." J. Opt. Soc. Am. A/vol. 12, No. 5 /May 1995.
Li Li et al.; "Visible broadband, wide-angle, thin-film multilayer polarizing beam splitter." Applied Optics May 1, 1996, vol. 35, No. 13, pp. 2221-2224.
Lloyd; Manual of Advanced Undergraduate Experiments in Physics, p. 302 (1959).
Lockbihler et al.; "Diffraction from highly conducting wire gratings of arbitrary cross-section." Journal of Modern Optics, 1993, vol. 40, No. 7, pp. 1273-1298.
Lopez et al.; "Wave-plate polarizing beam splitter based on a form-birefringent multilayer grating." Optics Letters, vol. 23, No. 20, pp. 1627-1629, Oct. 15, 1998.
Maystre & Dainty; Modern Analysis of Scattering Phenomena Proceeding from International Workshop held at Domaine deTournon, Aix en Provence, France Sep. 5-8, 1990.
Moshier et al.; "The Corrosion and Passively of Aluminum Exposed to Dilute Sodium Sulfate Solutions." Corrosion Science vol. 27. No. 8 pp. 785-801; (1987).
N.M. Ceglio; Invited Review "Revolution in X-Ray Optics." J. X-Ray Science & Tech. 1; pp. 7-78 (1989).
Nordin et al.; "Micropolarizer array for infrared imaging polarimetry." J. Op. Soc. Am. A. vol. 16 No. 5, May 1999.
Novak et al.; "Far infrared polarizing grids for use at cryogenic temperatures." Applied Optics, Aug. 15, 1989/vol. 28, No. 15, pp. 3425-3427.
Optics 9$^{th}$ Edition, pp. 338-339; (1980).
PCT Application No. PCT/US2012/043979; Filing date Jun. 25, 2012; Moxtek, Inc. et al.; International Search Report dated Feb. 1, 2013.
PCT Application No. PCT/US2014/045287; Filing date Jul. 2, 2014; Moxtek, Inc.; International Search Report mailed Nov. 7, 2014.
PCT Application No. PCT/US2008/055685; Filing date Mar. 3, 2008; Moxtek, Inc. et al.; International Search Report mailed Jun. 27, 2008.
PCT Application No. PCT/US2014/053083; Filing date Aug. 28, 2014; Moxtek, Inc.; International Search Report mailed Dec. 8, 2014.

(56) References Cited

OTHER PUBLICATIONS

PCT Application No. PCT/US2014/053161; Filing date Aug. 28, 2014; Moxtek, Inc.; International Search Report mailed Dec. 8, 2014.
PCT Application No. PCT/US2014/053216; Filing date Aug. 28, 2014; Moxtek, Inc.; International Search Report mailed Dec. 8, 2014.
Pentico et al.; "New, High Performance, Durable Polarizers for Projection Displays." SID 01 Digest, 2001, pp. 1287-1289.
Richter et al.; "Design considerations of form birefringent microstructures." Applied Optics, vol. 34, No. 14, pp. 2421-2429, May 10, 1995.
Robinson et al.; "Wide Field of View Compensation Scheme for Cube Polarizing Beam Splitters." SID 03 Digest, pp. 1-4, www.colorlink.com.
Savas et al.; "Achromatic interferometric lithography for 100-nm-period gratings and grids." Journal Vac. Sci. Technology B, Nov./Dec. 1995, pp. 2732-2735, vol. 13, No. 6.
Scandurra et al.; "Corrosion Inhibition of Al Metal in Microelectronic Devices Assemble in Plastic Packages." Journal of the Electrochemical Society, 148 (8) B289-B292 (2001).
Sonek et al.; "Ultraviolet grating polarizers." J. Vac. Sci. Technol., 19(4), Nov./Dec. 1981, pp. 921-923.
Sze; VLSI Technology; 1988; pp. 198-199; $2^{nd}$ Edition; McGraw-Hill Publishing Company.
Takano et al.; "Cube polarizers by the use of metal particles in anodic alumina films." Applied Optics, vol. 33, No. 16, 3507-3512, Jun. 1, 1994.
Tyan et al.; "Polarizing beam splitter based on the anisotropic spectral reflectivity characteristic of form-birefringent multilayer gratings." Optics Letters, May 15, 1996, pp. 761-763, vol. 21, No. 10.
Tyan et al.; "Design, fabrication, and characterization of form-birefringent multilayer polarizing beam splitter." Optical Society of America, vol. 14, No. 7, pp. 1627-1636, Jul. 1997.
U.S. Appl. No. 13/937,433, filed Jul. 9, 2013; Paul Steven Mills.
Wang et al.; "Diffractive optics: nanoimprint lithography enables fabrication of subwavelength optics." LaserFocusWorld, http://lfw.pennnet.com/Articles/Article_Dispaly.cf . . . Apr. 19, 2006, 6 pages.
Wang et al.; "Fabrication of a new broadband waveguide polarizer with a double-layer 190 nm period metal-gratings using nanoimprint lithography." Journal Vac. Sci. Technology B, Nov./Dec. 1999, pp. 2957-2960, vol. 17, No. 6.
Wang et al.; "High-performance large-area ultra-broadband (UV to IR) nanowire-grid polarizers and polarizing beam-splitters." Proc. of SPIE 2005, pp. 1-12, vol. 5931.
Wang et al.; "High-performance nanowire-grid polarizers" Optical Society of America. 2005, pp. 195-197, vol. 30, No. 2.
Wang et al.; "Monolithically integrated isolators based on nanowire-grid polarizers." IEEE, Photonics Technology Letters, Feb. 2005, pp. 396-398, vol. 17, No. 2.
Wang, et al.; "Innovative High-Performance Nanowire-Grid Polarizers and integrated Isolators," IEEE Journal of Selected Topics in Quantum Electronics, pp. 241-253, vol. 11 No. 1 Jan./Feb. 2005.
Wang et al.; "Free-Space nano-optical devices and integration: design, fabrication, and manufacturing." Bell Labs Technical Journal, 2005 pp. 107-127, vol. 10, No. 3.
Whitbourn et al.; "Phase shifts in transmission line models of thin periodic metal grids." Applied Optics Aug. 15, 1989 vol. 28, No. 15, pp. 3511-3515.
Zhang et al.; "A broad-angle polarization beam splitter based on a simple dielectric periodic structure." Optics Express, Oct. 29, 2007, 6 pages, vol. 15, No. 22.

\* cited by examiner

POLARIZER WITH VARIABLE INTER-WIRE DISTANCE

CLAIM OF PRIORITY

This claims priority to U.S. Provisional Patent Application No. 61/924,569, filed on Jan. 7, 2014, 61/924,560, filed on Jan. 7, 2014, 61/895,225, filed on Oct. 24, 2013, which are hereby incorporated herein by reference in their entirety.

FIELD OF THE INVENTION

The present application is related generally to wire grid polarizers.

BACKGROUND

Wire grid polarizers may be used for polarizing light, by allowing one polarization of light to pass through the polarizer, and reflecting or absorbing an opposite polarization of light. For simplicity, the polarization that primarily passes through the polarizer will be hereafter referred to as p-polarized light and the polarization that is primarily reflected or absorbed will be hereafter referred to as s-polarized light. Goals of wire grid polarizer design include increasing transmission of p-polarized light, decreasing transmission of s-polarized light, and increasing reflection or absorption of s-polarized light. Different applications have different requirements.

The goals of increasing transmission of p-polarized light and decreasing transmission of s-polarized light are common to most or all applications. There can be a trade-off between these two. In other words, certain designs that may increase transmission of p-polarized light may also undesirably increase transmission of s-polarized light. Other designs that decrease transmission of s-polarized light may also undesirably decrease transmission of p-polarized light.

For some applications, it is desirable to reflect as much s-polarized light as possible. For example, reflected light from a wire grid polarizing beam splitter can effectively utilize both the transmitted p-polarized light and the reflected s-polarized light. It can be important in such designs to increase reflection of s-polarized light without reducing transmission of p-polarized light. Sometimes there is a trade-off in a particular design between increasing transmission of p-polarized light and increasing reflection of s-polarized light.

For other applications, absorption of s-polarized light may be preferred, such as for example if reflection of light can disrupt the image or other intended use. In a transmissive panel image projection system, reflected light may go back into the LCD imager causing image degradation, or stray light can reach the screen, degrading contrast. An ideal selectively absorptive wire grid polarizer will transmit all p-polarized light and selectively absorb all s-polarized light. In reality, some s-polarized light is transmitted and some reflected and some p-polarized light is absorbed and some reflected. Sometimes there is a trade-off in a particular design between increasing transmission of p-polarized light and increasing absorption of s-polarized light.

The effectiveness of a wire grid polarizer can thus be quantified by (1) high transmission of p-polarized light; (2) high contrast; and (3) depending on the design, high absorption or reflection of s-polarized light. Contrast is equal to percent of p-polarized light transmitted (Tp) divided by percent of s-polarized light transmitted (Ts): Contrast=Tp/Ts.

It can be important in wire grid polarizers for infrared, visible, and ultraviolet light to have small wires with small pitch, such as nanometer or micrometer size and pitch, for effective polarization. Typically, a pitch of less than half of the wavelength of light to be polarized is needed for effective polarization. Smaller pitches may improve the contrast. Thus, small pitch can be an important feature of wire grid polarizers. Manufacture of wire grid polarizers with sufficiently small pitch is challenging, and is a goal of research in this field.

Small wires can be damaged by handling and by environmental conditions. Protection of the wires can be important in wire grid polarizers. Durability of wire grid polarizers is thus another important feature. Increasing degrees of freedom of the polarizer can be valuable at allowing a wire grid polarizer to optimize its design for a specific application or wavelength.

For example, see U.S. Pat. No. 5,991,075, U.S. Pat. No. 6,288,840, U.S. Pat. No. 6,665,119, U.S. Pat. No. 7,630,133, U.S. Pat. No. 7,692,860, U.S. Pat. No. 7,800,823, U.S. Pat. No. 7,961,393, and U.S. Pat. No. 8,426,121; U.S. Patent Publication Numbers US 2008/0055723, US 2009/0041971, and US 2009/0053655; U.S. patent application Ser. No. 13/326,566, filed on Dec. 15, 2011; "Application of 100 Å linewidth structures fabricated by shadowing techniques" by D. C. Flanders in J. Vac. Sci. Technol., 19(4), November/December 1981; and "Submicron periodicity gratings as artificial anisotropic dielectrics" by Dale C. Flanders in Appl. Phys. Lett. 42 (6), 15 Mar. 1983, pp. 492-494.

SUMMARY

It has been recognized that it would be advantageous to provide a durable wire grid polarizer with high transmission of p-polarized light, high contrast, and/or small pitch. High absorption or high reflection of s-polarized light, depending on the design, can also be important. It has been recognized that it would be advantageous to provide a wire grid polarizer with increased degrees of freedom. The present invention is directed to various embodiments of, and methods of making, wire grid polarizers. Each of the various embodiments or methods may satisfy one or more of these needs.

In one embodiment, the wire grid polarizer can comprise an array of parallel, elongated nano-structures disposed over a surface of a substrate. Each of the nano-structures can include a pair of parallel, elongated wires, each oriented laterally with respect to one another. Each wire of the pair of wires can include a top rib disposed over a bottom rib. There can be a first gap disposed between the pair of wires. The first gap can extend between adjacent top ribs and adjacent bottom ribs. Each of the nano-structures can be separated from an adjacent nano-structure by a second gap disposed between adjacent nanostructures, and thus between adjacent pairs of wires. A first gap width of the first gap can be different than a second gap width of the second gap.

In another embodiment, the wire grid polarizer can comprise an array of parallel, elongated nano-structures disposed over a surface of a substrate. Each of the nano-structures can include a pair of parallel, elongated top ribs, each oriented laterally with respect to one another, and a first gap disposed between the pair of top ribs. Each of the nano-structures can be separated from an adjacent nano-structure by a second gap disposed between adjacent nanostructures, and thus between adjacent pairs of top ribs. There can be a first gap width of the first gap that is different than a second gap width of the second gap.

A method of making a wire grid polarizer can comprise some or all of the following steps:

1. providing a transmissive substrate having an array of parallel, elongated support ribs disposed over the substrate with solid-material-free support-rib gaps between the support ribs;
2. conformal coating the substrate and the support ribs with a layer of material while maintaining the support-rib gaps between the support ribs;
3. etching the layer of material to remove horizontal segments and leaving an array of parallel, elongated top ribs along sides of the support ribs, including a pair of top ribs for each support rib with a top rib disposed along each side of the support rib;
4. backfilling the support-rib gaps and above tops of the support ribs with first fill material, the first fill material and the support ribs having similar etch properties;
5. etching the first fill material down to tops of the top ribs and tops of the support ribs; and
6. etching the support ribs and the first fill material in the support-rib gaps down to a base of the top ribs.

BRIEF DESCRIPTION OF THE DRAWINGS

FIGS. 1-10 are schematic cross-sectional side views illustrating methods of manufacture of wire grid polarizers, according to embodiments of the present invention;

FIG. 4 shows a step of providing a substrate 11 having an array of parallel, elongated support ribs 13 disposed over the substrate 11 with solid-material-free support-rib gaps $G_s$ between the support ribs 13, according to an embodiment of the present invention;

FIG. 5 shows a step of conformal coating the substrate 11 and the support ribs 13 with a layer of material 52 while maintaining the support-rib gaps $G_s$ between the support ribs 13, according to an embodiment of the present invention;

FIGS. 5-6 shows a step of etching the layer of material 52 to remove horizontal segments $52_h$ and leaving an array of parallel, elongated top ribs 12 along sides of the support ribs 13, including a pair of top ribs 12 for each support rib 13 with a top rib 12 disposed along each side of the support rib 13, according to an embodiment of the present invention;

FIG. 7 shows a step of backfilling the support-rib gaps $G_s$ and above tops $13_t$ of the support ribs 13 with a solid first fill material 71, according to an embodiment of the present invention;

FIG. 8 shows a step of etching the first fill material 71 at least down to tops $12_t$ of the top ribs 12 and tops $13_t$ of the support ribs 13, according to an embodiment of the present invention;

FIG. 9 shows a step of etching the support ribs 13 and the first fill material 71 in the support-rib gaps $G_s$ down to a base $12_b$ of the top ribs 12, according to an embodiment of the present invention;

FIGS. 10 & 1 show a step of using the top ribs 12 as a mask, etching 101 the substrate 11 between top ribs 12 thus forming an array of parallel elongated bottom ribs 14, with each bottom rib 14 disposed below a top rib 12, with each top rib 12 and bottom rib 14 together defining a wire 16, with gaps G between adjacent wires 16, according to an embodiment of the present invention;

FIG. 2 shows a step of backfilling the gaps G between the wires 16 and above tops $16_t$ of the wires 16 with second fill material 21, according to an embodiment of the present invention; and FIG. 3 shows a step of etching the second fill material 21 at least down to tops $16_t$ of the wires 16, forming a second fill material rib $21_r$ in each gap G, according to an embodiment of the present invention.

Figure 1:
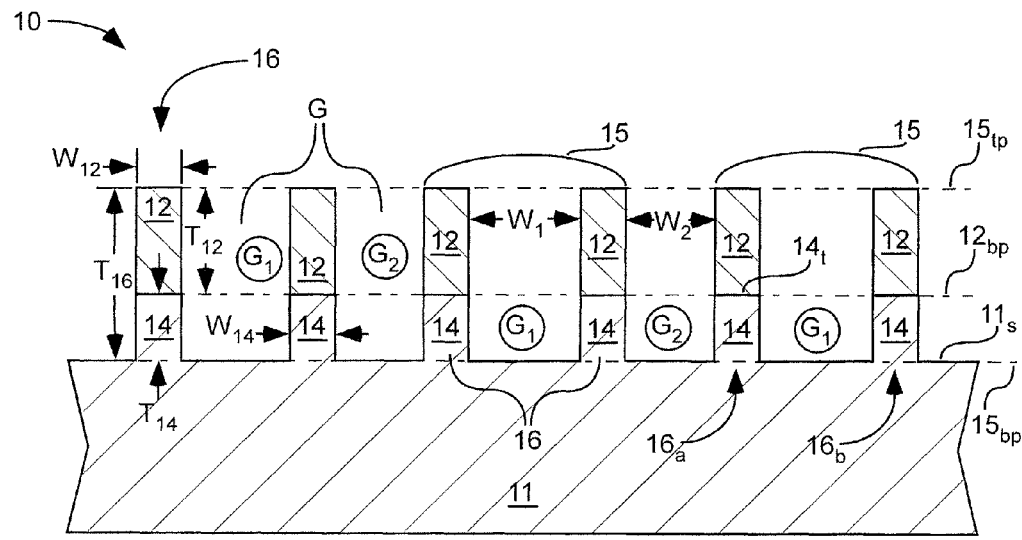
FIG. 1 is a schematic cross-sectional side view of a wire grid polarizer 10 comprising an array of parallel, elongated nano-structures 15, each of the nano-structures 15 including a pair of parallel, elongated wires 16, each oriented laterally with respect to one another, each including a top rib 12 disposed over a bottom rib 14, a first gap $G_1$ disposed between the pair of top ribs 12, and each of the nano-structures 15 separated from an adjacent nano-structure 15 by a second gap $G_2$, in accordance with an embodiment of the present invention.

REFERENCE NUMBERS IN THE DRAWINGS 10 wire grid polarizer
11 substrate
$11_s$ substrate surface
12 top rib
$12_b$ base of the top rib
$12_{bp}$ common plane at a base of the top rib
$12_{tp}$ common plane at a top of the top rib
$12_t$ top of the top rib
13 support rib
$13_t$ support rib top
14 bottom rib
$14_t$ top of the bottom rib
15 nano-structure
$15_b$ base of the nanostructure
$15_{bp}$ common plane at a base of the nanostructure
$15_t$ top of the nanostructure
$15_{tp}$ common plane at a top of the nanostructure
16 wire
$16_a$ individual wire in a pair of wires
$16_b$ individual wire in a pair of wires
$16_t$ wire top
20 wire grid polarizer
21 second fill material
$21_r$ second fill material rib
$21_{r1}$ second fill material rib in the first gap
$21_{r2}$ second fill material rib in the second gap
30 wire grid polarizer
51 etch
52 layer of material $52_h$ horizontal segments of the layer of material
$52_v$ vertical segments of the layer of material
71 first fill material
90 wire grid polarizer
101 etch
G gap
$G_1$ first gap
$G_2$ second gap
$G_s$ support-rib gap
$Th_{12}$ top rib thickness
$Th_{14}$ bottom rib thickness
$Th_{16}$ wire thickness
$W_1$ first gap width
$W_2$ second gap width
$W_{12}$ top rib width
$W_{13}$ support rib width
$W_{14}$ bottom rib width
$W_{16}$ wire width
$W_{52}$ layer of material width

DEFINITIONS

Many materials used in optical structures absorb some light, reflect some light, and transmit some light. The following definitions are intended to distinguish between materials or structures that are primarily absorptive, primarily reflective, or primarily transmissive.

1. As used herein, the term "absorptive" means substantially absorptive of light in the wavelength of interest.
   a. Whether a material is "absorptive" is relative to other materials used in the polarizer. Thus, an absorptive structure will absorb substantially more than a reflective or a transmissive structure.
   b. Whether a material is "absorptive" is dependent on the wavelength of interest. A material can be absorptive in one wavelength range but not in another.
   c. In one aspect, an absorptive structure can absorb greater than 40% and reflect less than 60% of light in the wavelength of interest (assuming the absorptive structure is an optically thick film—i.e. greater than the skin depth thickness).
   d. Absorptive ribs can be used for selectively absorbing one polarization of light.
2. As used herein, the term "reflective" means substantially reflective of light in the wavelength of interest.
   a. Whether a material is "reflective" is relative to other materials used in the polarizer. Thus, a reflective structure will reflect substantially more than an absorptive or a transmissive structure.
   b. Whether a material is "reflective" is dependent on the wavelength of interest. A material can be reflective in one wavelength range but not in another. Some wavelength ranges can effectively utilize highly reflective materials. At other wavelength ranges, especially lower wavelengths where material degradation is more likely to occur, the choice of materials may be more limited and an optical designer may need to accept materials with a lower reflectance than desired.
   c. In one aspect, a reflective structure can reflect greater than 80% and absorb less than 20% of light in the wavelength of interest (assuming the reflective structure is an optically thick film—i.e. greater than the skin depth thickness).
   d. Metals are often used as reflective materials.
   e. Reflective wires can be used for separating one polarization of light from an opposite polarization of light.
3. As used herein, the term "transmissive" means substantially transmissive to light in the wavelength of interest.
   a. Whether a material is "transmissive" is relative to other materials used in the polarizer. Thus, a transmissive structure will transmit substantially more than an absorptive or a reflective structure.
   b. Whether a material is "transmissive" is dependent on the wavelength of interest. A material can be transmissive in one wavelength range but not in another.
   c. In one aspect, a transmissive structure can transmit greater than 90% and absorb less than 10% of light in the wavelength of interest.
4. As used in these definitions, the term "material" refers to the overall material of a particular structure. Thus, a structure that is "absorptive" is made of a material that as a whole is substantially absorptive, even though the material may include some reflective or transmissive components. Thus for example, a rib made of a sufficient amount of absorptive material so that it substantially absorbs light is an absorptive rib even though the rib may include some reflective or transmissive material embedded therein.
5. As used herein, the term "light" can mean light or electromagnetic radiation in the x-ray, ultraviolet, visible, and/or infrared, or other regions of the electromagnetic spectrum.
6. As used herein, the term "substrate" includes a base material, such as for example a glass wafer. The term "substrate" includes a single material, and also includes multiple materials, such as for example a glass wafer with at least one thin film on a surface of the wafer used together as the base material.

DETAILED DESCRIPTION

Figure 2:
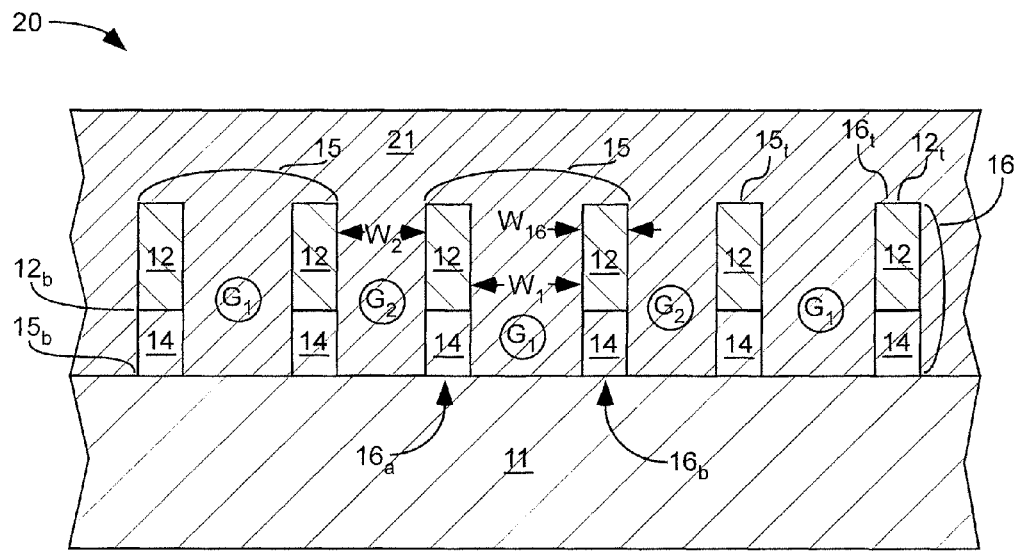
FIG. 2 is a schematic cross-sectional side view of a wire grid polarizer 20, similar to wire grid polarizer 10, but also including a second fill material 21 disposed in the first gaps $G_1$ and in the second gaps $G_2$, the second fill material 21 extending above a top $15_t$ of the nanostructures 15, in accordance with an embodiment of the present invention.
Figure 3:
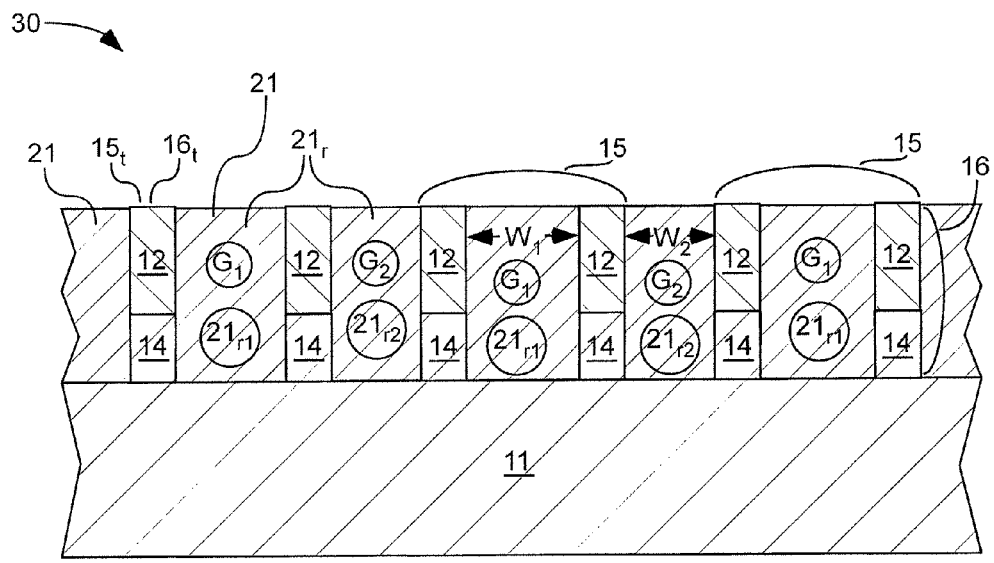
FIG. 3 is a schematic cross-sectional side view of a wire grid polarizer 30, similar to wire grid polarizer 10, but also including a second fill material 21 disposed in the first gaps $G_1$ and in the second gaps $G_2$, the second fill material 21 terminating at or below a top $15_t$ of the nanostructures 15, and the nanostructures 15 separating the second fill material 21 in one gap G from the second fill material 21 in an adjacent gap G, such that the second fill material 21 forms an array of second fill material ribs $21_r$, in accordance with an embodiment of the present invention.

As illustrated in FIGS. 1-3, wire grid polarizers 10, 20, and 30 are shown comprising an array of parallel, elongated nanostructures 15 disposed over a surface $11_s$ of a substrate 11. The substrate can be a sheet of glass or a wafer, and can be thin with two opposite, planar surfaces. Each of the nano-structures 15 can include a pair (e.g. see $16_a$ and $16_b$) of parallel, elongated wires 16, each oriented laterally with respect to one another. Each wire 16 of the pair of wires 16 can include a top rib 12 disposed over a bottom rib 14. There can be a first gap $G_1$ disposed between two wires 16 of the pair of wires 16. The first gap $G_1$ can extend between adjacent top ribs 12 and adjacent bottom ribs 14. Each of the nano-structures 15 can be separated from an adjacent nano-structure 15 by a second gap $G_2$ disposed between adjacent nanostructures 15, and thus between adjacent pairs of wires 16. The first gap $G_1$ and/or the second gap $G_2$ can be air-filled gaps G (see in FIG. 1). The first gap $G_1$ and/or the second gap $G_2$ can be filled partially or totally with a solid material (see 21 in FIGS. 2-3). A comparison of a width $W_1$ of the first gap $G_1$ to a width $W_2$ of the second gap $G_2$ is described below.

The first gap $G_1$ and the second gap $G_2$ can extend from a base $15_b$ of the nanostructures 15 to a top $15_t$ of the nanostructures 15. The base $15_b$ of the nanostructures 15 can substantially terminate in a common plane $15_{bp}$. A top $15_t$ of the nanostructures 15 can substantially terminate in a common plane $15_{tp}$. A base $12_b$ of the top ribs 12 can substantially terminate in a common plane $12_{bp}$ and a top $14_t$ of the bottom ribs 14 can also substantially terminate in this common plane $12_{bp}$.

As shown in FIGS. 2-3, a solid second fill material 21 can be disposed in the first gaps $G_2$ and in the second gaps $G_2$. As shown on wire grid polarizer 20 in FIG. 2, the second fill material 21 can further extend above a top $15_t$ of the nanostructures 15. As shown on wire grid polarizer 30 in FIG. 3, the second fill material 21 can terminate at or below a top 15$_t$ of the nanostructures 15, and the nanostructures 15 can separate the second fill material 21 in one gap G from the second fill material 21 in an adjacent gap G, such that the second fill material 21 forms an array of second fill material ribs 21$_r$. Thus for example, the nanostructures 15 separate second fill material ribs 21$_{r1}$ in the first gaps G$_1$ from second fill material ribs 21$_{r2}$ in the second gaps G$_2$. The second fill material 21 can improve wire grid polarizer durability, but can also adversely affect wire grid polarizer performance, such as by decreasing transmission of p-polarized light. The need for durability can be balanced against possible degradation in performance for each wire grid polarizer design.

Figure 9:
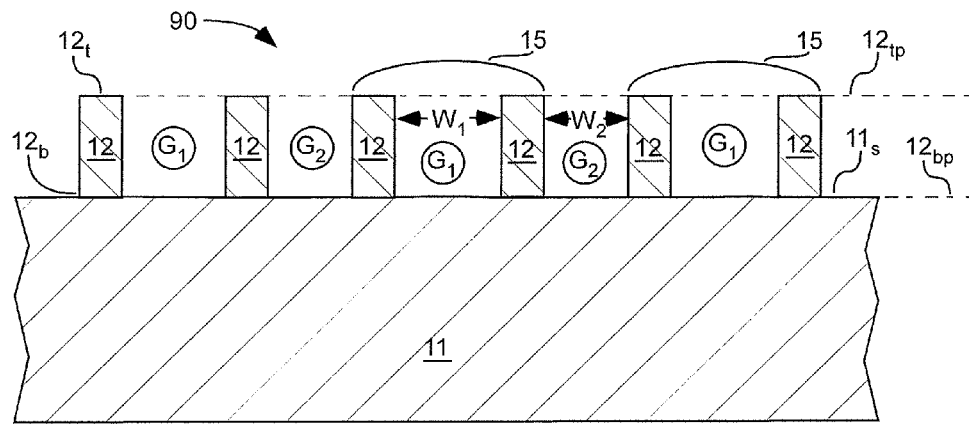
FIG. 9 is a schematic cross-sectional side view of a wire grid polarizer 90 comprising an array of parallel, elongated nano-structures 15, each of the nano-structures 15 including a pair of parallel, elongated top ribs 12, each oriented laterally with respect to one another, a first gap $G_1$ disposed between the pair of top ribs 12, and each of the nano-structures 15 separated from an adjacent nano-structure 15 by a second gap $G_2$, in accordance with an embodiment of the present invention.

As illustrated in FIG. 9, a wire grid polarizer 90 is shown comprising an array of parallel, elongated nano-structures 15 disposed over a surface 11$s$ of a substrate 11. Each of the nano-structures 15 can include a pair of parallel, elongated top ribs 12, each oriented laterally with respect to one another, and a first gap G$_1$ disposed between the pair of top ribs 12. Each of the nano-structures 15 can be separated from an adjacent nano-structure 15 by a second gap G$_2$ disposed between adjacent nanostructures 15, and thus between adjacent pairs of top ribs 12. The first gap G$_1$ and the second gap G$_2$ can extend from a base 12$_b$ of the top ribs 12 to a top 12$_t$ of the top ribs 12. A top 12$_t$ of the top ribs 12 can substantially terminate in a common plane 12$_{tp}$, a top surface of the substrate 11$_s$ can substantially terminate in a common plane 12$_{bp}$, and a base 12$_b$ of the top ribs 12 can substantially terminate in the common plane 12$_{bp}$ at the top surface 11$_s$ of the substrate 11. The first gap G$_1$ and/or the second gap G$_2$ can be air-filled gaps G. Alternatively, the first gap G$_1$ and/or the second gap G$_2$ can be filled partially or totally with a solid material (e.g. add the second fill material 21 shown in FIGS. 2-3 to the polarizer 90 shown in FIG. 9). A comparison of a width W$_1$ of the first gap G$_1$ to a width W$_2$ of the second gap G$_2$ is described below.

Method of Making a Wire Grid Polarizer

A method of making a wire grid polarizer can comprise some or all of the following steps. These steps can be performed in order in the order specified.

Figure 4:
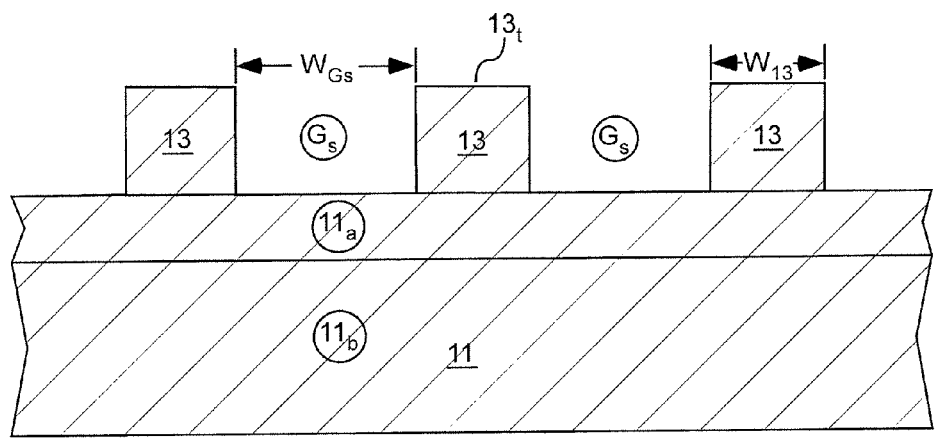
Figure 5:
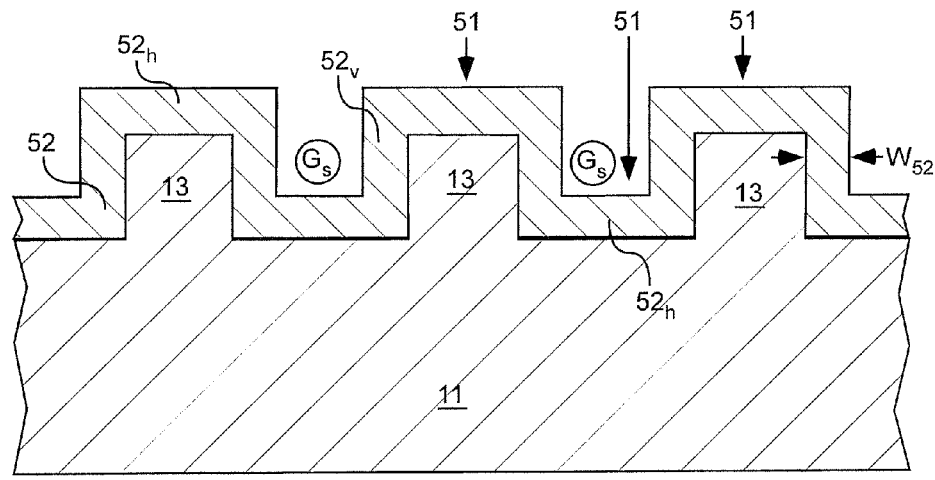
Figure 6:
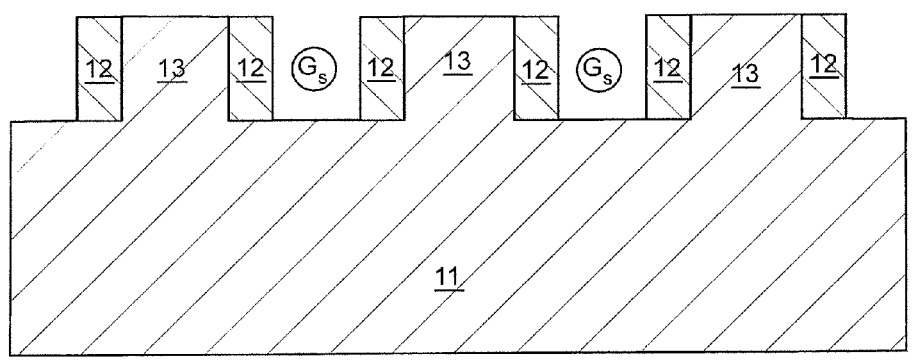
Figure 7:
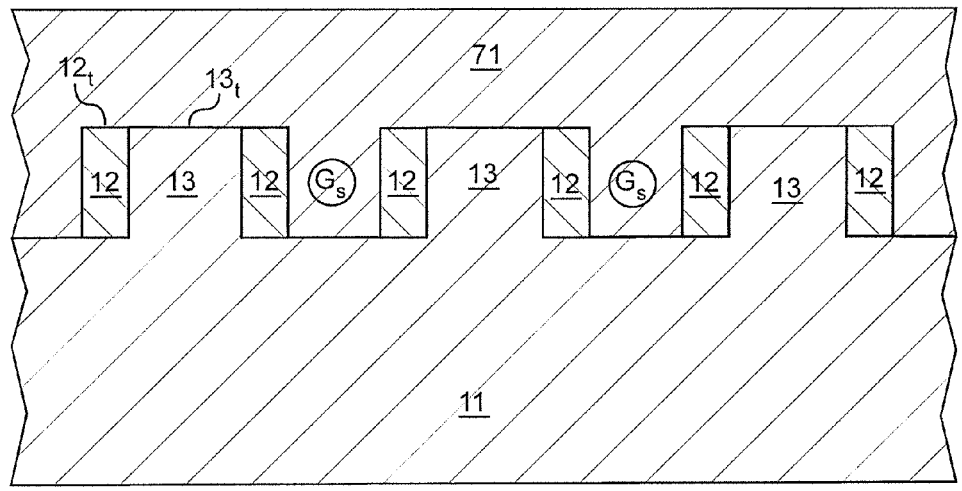
Figure 8:
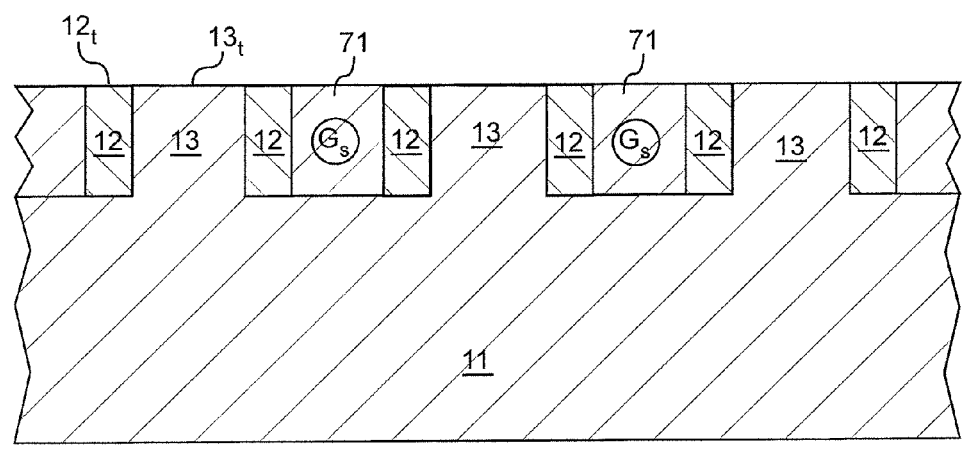
Figure 10:
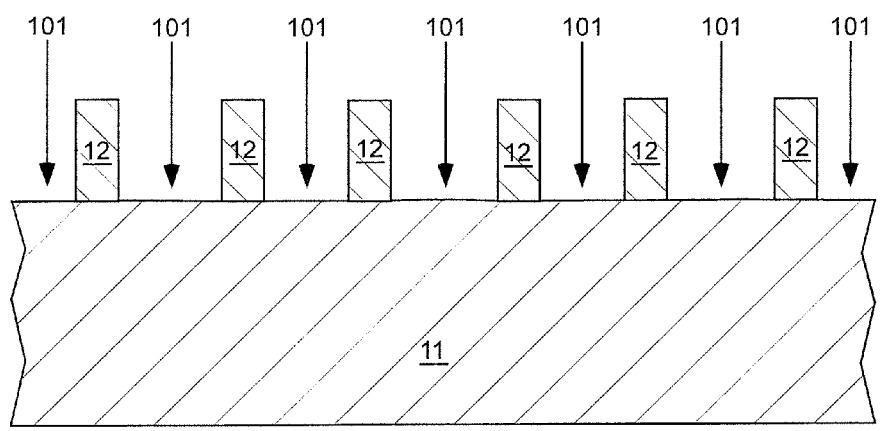

1. Providing a substrate 11 having an array of parallel, elongated support ribs 13 disposed over the substrate 11 with solid-material-free support-rib gaps G$_s$ between the support ribs 13. See FIG. 4.
    a. This step may be accomplished by patterning and etching a substrate 11.
    b. The substrate may be homogenous and made of a single material, such as a wafer of glass for example. The support ribs 13 can be formed by etching into the substrate 11 and thus can be integrally formed from, and made of the same material as, the final substrate 11. Alternatively, the substrate 11 and the support ribs 13 can be formed of different materials.
    c. The substrate 11 can include multiple regions 11$a$-$b$. Region 11$a$ can become the eventual material of the bottom ribs 14 (e.g. transmissive, absorptive, or reflective) and region 11$b$ can be the eventual substrate 11 below the wires 16.
2. Conformal coating the substrate 11 and the support ribs 13 with a layer of material 52 while maintaining the support-rib gaps G$_s$ between the support ribs 13. The conformal coating may be done by various methods, such as for example atomic layer deposition (ALD) or sputter. See FIG. 5. The layer of material 52 can be the material of the top ribs 12 that will be formed in the next step.
3. Etching 51 the layer of material 52 to remove horizontal segments 52$_h$ and leaving an array of parallel, elongated top ribs 12 along sides of the support ribs 13, including a pair of top ribs 12 for each support rib 13 with a top rib 12 disposed along each side of the support rib 13. An anisotropic etch 51 can etch away horizontal segments 52$_h$, but leave most of the vertical segments 52$_v$ due to the directional nature of this etch 51. See FIGS. 5-6.
4. Backfilling the support-rib gaps G$_s$ and above tops 13$_t$ of the support ribs 13 with a solid first fill material 71. See FIG. 7. The first fill material 71 can be formed by spinning on a liquid that can harden upon evaporation of an included solvent. For example, spin-on a liquid glass in a solvent, then bake out the solvent. Another method is applying multiple layers by atomic layer deposition (ALD).
5. Etching the first fill material 71 down to tops 12$_t$ of the top ribs 12 and tops 13$_t$ of the support ribs 13. See FIG. 8.
6. Etching the support ribs 13 and the first fill material 71 in the support-rib gaps G$_s$ down to a base 12$_b$ of the top ribs 12. The first fill material 71 and the support ribs 13 can have similar etch properties and an etch can be selected to preferentially etch the first fill material 71 and the support ribs 13 with minimal etch of the top ribs 12. See FIG. 9.
7. Using the top ribs 12 as a mask, etching 101 the substrate 11 between top ribs 12 thus forming an array of parallel elongated bottom ribs 14, with each bottom rib 14 disposed below a top rib 12, with each top rib 12 and bottom rib 14 together defining a wire 16, with gaps G between adjacent wires 16. See FIGS. 1 and 10. An etch can be selected to preferentially etch the substrate 11 with minimal etch of the top ribs 12. The remaining substrate 11 can be transmissive.
8. Backfilling the gaps G between the wires 16 and above tops 16$_t$ of the wires 16 with second fill material 21. See FIG. 2.
9. Etching the second fill material 21 at least down to tops 16$_t$ of the wires 16, forming a second fill material rib 21$_r$ in each gap G. See FIG. 3.

Gap Width (W$_1$ and W$_2$) Relationships

For the polarizers described above (10, 20, 30, and 90), a first gap width W$_1$ of the first gap G$_1$ can be different than a second gap width W$_2$ of the second gap G$_2$. Varying the first gap width W$_1$ with respect to the second gap width W$_2$ can affect transmission of p-polarized light (Tp) and transmission of s-polarized light (Ts). The effect of this relationship between the two gaps G is wavelength dependent. Having the ability to adjust one gap width (W$_1$ or W$_2$) with respect to the other gap width (W$_2$ or W$_1$) thus gives a polarizer designer an additional degree of freedom in optimizing wire grid polarizer design, and allows optimization of a polarizer for a specific wavelength or range of wavelengths of light.

There can be many different ratios of the two gap widths, depending on desired wavelength range of use and overall polarizer structure. For example, a ratio of the two gap widths can be from 1.05 to 1.3 in one aspect, from 1.3 to 1.5 in another aspect, from 1.5 to 2.0 in another aspect, greater than 1.15 in another aspect, or greater than 2.0 in another aspect. In other words, a larger of the first gap width W$_1$ or the second gap width W$_2$ divided by a smaller of the first gap width W$_1$ or the second gap width W$_2$ can be greater than or equal to 1.05 and less than or equal to $$1.3 \left( 1.05 \leq \frac{W_1}{W_2} \leq 1.3 \text{ or } 1.05 \leq \frac{W_2}{W_1} \leq 1.3 \right)$$

in one aspect, greater than or equal to 1.3 and less than or equal to 1.5 in another aspect $$\left(1.3 \le \frac{W_1}{W_2} \le 1.5 \text{ or } 1.3 \le \frac{W_2}{W_1} \le 1.5\right),$$

greater than or equal to 1.5 and less than or equal to 2.0 in another aspect $$\left(1.5 \le \frac{W_1}{W_2} \le 2.0 \text{ or } 1.5 \le \frac{W_2}{W_1} \le 2.0\right),$$

greater than 1.15 in another aspect $$\left(1.15 \le \frac{W_1}{W_2} \text{ or } 1.15 \le \frac{W_2}{W_1}\right),$$

or greater than 2.0 in another aspect $$\left(2.0 \le \frac{W_1}{W_2} \text{ or } 2.0 \le \frac{W_2}{W_1}\right).$$

A difference between the first gap width $W_1$ and the second gap width $W_2$ can be between 5 nanometers and 20 nanometers in one aspect, between 19 nanometers and 40 nanometers, or between 39 nanometers and 100 nanometers in another aspect. A difference between the first gap width $W_1$ and the second gap width $W_2$ can be at least 5 nanometers in one aspect, at least 10 nanometers in another aspect, or at least 25 nanometers in another aspect.

The first gap width $W_1$ can be the same as, or approximately the same as, the support rib width $W_{13}$. The second gap width $W_2$ can be approximately equal to the support rib gap width $W_{G8}$ minus two times the wire width $W_{16}$ ($W_2 = W_{Gs} - 2 * W_{16}$). Support rib gap width $W_{Gs}$ and support rib width $W_{13}$ can be controlled by the lithography technique (mask, interference lithography, etc.) used to make the support ribs 13. Wire width $W_{16}$ can be controlled by the layer of material width $W_{52}$, which can be determined by the deposition technique used (e.g. ALD or sputter) and duration of application of this layer of material 52.

A width $W_{12}$ of the top ribs 12 can be the same as or approximately the same as a width $W_{14}$ of the bottom ribs 14, and this can equal wire width $W_{16}$. Alternatively, depending on the nature of the etch used to form the bottom ribs 14 while using the top ribs 12 as a mask, and the materials used for the top ribs 12 and the bottom ribs 14, the top rib width $W_{12}$ can be different from the bottom rib width $W_{14}$. For example, if the etch has increased isotropic property, and if the bottom ribs 14 etch more easily than the top ribs 12, then these widths can differ from each other. Wire grid performance at the desired wavelength(s) and durability are factors to consider in a determination of whether these widths should be equal or not.

Measurement of width on an actual wire grid polarizer may be less precise than measurement on a drawing because the wires 16 or ribs 12 and 14 can lean to one side and can vary in width from top to bottom. Thus, if there question of where to measure in order to determine if the widths fall within the requirements specified above, then measure at base $12_b$ of the top ribs 12.

General Information for all Embodiments

At least one of the top ribs 12, the bottom ribs 14, or the second fill material ribs $21_r$ can be absorptive in order to substantially absorb one polarization state of the incoming light. At least one of the top ribs 12, the bottom ribs 14, or the second fill material ribs $21_r$ can be transmissive. At least one of the top ribs 12, the bottom ribs 14, or the second fill material ribs $21_r$ can be reflective in order to substantially polarize incident light. The substrate 11 and/or the second fill material 21 can be transmissive.

U.S. patent application Ser. No. 13/326,566, filed on Dec. 15, 2011, and U.S. Pat. Nos. 7,570,424 and 7,961,393, incorporated herein by reference in their entirety, provide examples of possible substrate materials, dielectric materials including absorptive dielectric materials and transmissive dielectric materials, and reflective materials. The reflective materials can also be made of a semiconductor material doped to achieve a desired level of conductivity, or other types of conductors such as certain forms of carbon.

The wire grid polarizers described herein can be made with a relatively high aspect ratio (top rib thickness divided by top rib width—$Th_{12}/W_{12}$, bottom rib thickness divided by bottom rib width—$Th_{14}/W_{14}$, and/or wire thickness divided by wire width—$Th_{16}/W_{16}$). A large aspect ratio can be accomplished by formation of relatively tall support ribs 13 in relation to a width $W_{52}$ of the layer of material 52 (which may approximate eventual top rib width $W_{12}$) and/or by a deep etch during formation of the bottom ribs 14.

Modeling has shown good polarization characteristics with aspect ratios (of the top ribs 12, the bottom ribs 14, or the wires 16) of between 8 and 60 in one aspect, between 4 and 7 in another aspect, or between 3 and 8 in another aspect, depending on the wavelength for desired polarization and overall wire grid polarizer design. Modeling has shown good polarization characteristics with a wire width $W_{16}$ of between 5 nm and 20 nm for polarization of some ultraviolet wavelengths. Modeling has shown good polarization characteristics with a top rib thickness $Th_{12}$ of between 50 nm and 100 nm in one aspect, between 90 nm and 160 nm in another aspect, or between 150 nm and 300 nm in another aspect, depending on the wavelength for desired polarization.

Lithography techniques can limit a possible minimum pitch. Lithography techniques can limit a pitch of the support ribs 13, but two wires 16 can be made for every support rib 13, thus effectively cutting the pitch in half. This small pitch allows for more effective polarization and allows polarization at lower wavelengths.

What is claimed is:

1. A wire grid polarizer comprising:
   an array of parallel, elongated nano-structures disposed over a surface of a transmissive substrate, each of the nano-structures including:
   a pair of parallel, elongated wires, each oriented laterally with respect to one another;
   each wire of the pair of wires includes a top rib disposed over a bottom rib; and
   a first gap disposed between the pair of wires, the first gap extending between adjacent top ribs and adjacent bottom ribs;
   each of the nano-structures separated from an adjacent nano-structure by a second gap disposed between adjacent nanostructures, and thus between adjacent pairs of wires; and
   a first gap width of the first gap being different than a second gap width of the second gap.

2. The wire grid polarizer of claim 1, wherein:
   one of the top rib or the bottom rib is absorptive in order to substantially absorb one polarization state of incoming light; and the other of the top rib or the bottom rib is reflective in order to substantially polarize incoming light.

3. The wire grid polarizer of claim 1, wherein a larger of the first gap width or the second gap width divided by a smaller of the first gap width or the second gap width is greater than or equal to 1.1 and less than or equal to 1.3.

4. The wire grid polarizer of claim 1, wherein a larger of the first gap width or the second gap width divided by a smaller of the first gap width or the second gap width is greater than or equal to 1.3 and less than or equal to 1.5.

5. The wire grid polarizer of claim 1, wherein a difference between the first gap width and the second gap width is between 5 nanometers and 20 nanometers.

6. The wire grid polarizer of claim 1, wherein a difference between the first gap width and the second gap width is between 19 nanometers and 40 nanometers.

7. The wire grid polarizer of claim 1, wherein a difference between the first gap width and the second gap width is at least 10 nanometers.

8. The wire grid polarizer of claim 1, wherein the first gap and the second gap extend from a base of the nanostructures to a top of the nanostructures.

9. The wire grid polarizer of claim 1, wherein a base of the nanostructures substantially terminates in a common plane and a top of the nanostructures substantially terminates in a common plane.

10. The wire grid polarizer of claim 1, wherein a top of the nanostructures substantially terminates in a common plane, a base of the nanostructures substantially terminates in a common plane, and a base of the top ribs substantially terminates in a common plane.

11. The wire grid polarizer of claim 1, further comprising a solid second fill material disposed in the first gaps and in the second gaps.

12. The wire grid polarizer of claim 11, wherein the second fill material extends above a top of the nanostructures and the second fill material is substantially transmissive to incoming light.

13. The wire grid polarizer of claim 11, wherein the second fill material terminates at or below a top of the nanostructures, and the nanostructures separate the second fill material in one gap from the second fill material in an adjacent gap, such that the second fill material forms an array of second fill material ribs.

14. The wire grid polarizer of claim 13, wherein:
at least one of the top ribs, the bottom ribs, or the second fill material ribs is absorptive in order to substantially absorb one polarization state of incoming light; and
at least one of the top ribs, the bottom ribs, or the second fill material ribs is reflective in order to substantially polarize incident light.

15. The wire grid polarizer of claim 1, wherein the first gaps and the second gaps are air-filled gaps.

16. A wire grid polarizer comprising:
an array of parallel, elongated nano-structures disposed over a surface of a transmissive substrate, each of the nano-structures including:
a pair of parallel, elongated top ribs, each oriented laterally with respect to one another;
the top ribs being reflective in order to substantially polarize incident light; and
a first gap disposed between the pair of top ribs;
each of the nano-structures separated from an adjacent nano-structure by a second gap disposed between adjacent nanostructures, and thus between adjacent pairs of top ribs;
a first gap width of the first gap being different than a second gap width of the second gap;
a larger of the first gap width or the second gap width divided by a smaller of the first gap width or the second gap width is greater than 1.15;
the first gap and the second gap extending from a base of the top ribs to a top of the top ribs; and
a top of the top ribs substantially terminates in a common plane, a top surface of the substrate substantially terminates in a common plane, and a base of the top ribs substantially terminates in the common plane at the top surface of the substrate.

17. The wire grid polarizer of claim 16, wherein the first gaps and the second gaps are air-filled gaps.

18. A method of making a wire grid polarizer, the method comprising the following steps in order:
providing a substrate having an array of parallel, elongated support ribs disposed over the substrate with solid-material-free support-rib gaps between the support ribs;
conformal coating the substrate and the support ribs with a layer of material while maintaining the support-rib gaps between the support ribs;
etching the layer of material to remove horizontal segments and leaving an array of parallel, elongated top ribs along sides of the support ribs, including a pair of top ribs for each support rib with a top rib disposed along each side of the support rib;
backfilling the support-rib gaps and above tops of the support ribs with a solid first fill material, the first fill material and the support ribs having similar etch properties;
etching the first fill material down to tops of the top ribs and tops of the support ribs;
etching the support ribs and the first fill material in the support-rib gaps down to a base of the top ribs;
using the top ribs as a mask, etching the substrate between top ribs thus forming an array of parallel elongated bottom ribs, with each bottom rib disposed below a top rib, with each top rib and bottom rib together defining a wire, with gaps between adjacent wires.

19. The method of claim 18, further comprising a subsequent step of backfilling the gaps between the wires and above tops of the wires with second fill material.

20. The method of claim 18, further comprising etching the second fill material at least down to tops of the wires, forming a second fill material rib in each gap.

* * * * *